(12) United States Patent
Cui et al.

(10) Patent No.: US 10,699,419 B2
(45) Date of Patent: Jun. 30, 2020

(54) TRACKING AND TRACEABILITY OF PARTS OF A PRODUCT

(71) Applicant: Siemens Aktiengesellschaft, Munich (DE)

(72) Inventors: Tao Cui, Princeton Junction, NJ (US); Justinian Rosca, West Windsor, NJ (US); Hasan Sinan Bank, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/126,292

(22) Filed: Sep. 10, 2018

(65) Prior Publication Data
US 2020/0082546 A1 Mar. 12, 2020

(51) Int. Cl.
| | |
|---|---|
| *G06T 7/246* | (2017.01) |
| *G01S 17/66* | (2006.01) |
| *G01J 5/10* | (2006.01) |
| *G06T 7/292* | (2017.01) |
| *G06T 7/00* | (2017.01) |
| *G06K 9/00* | (2006.01) |
| *H04N 5/04* | (2006.01) |

(52) U.S. Cl.
CPC ............ *G06T 7/246* (2017.01); *G01J 5/10* (2013.01); *G01S 17/66* (2013.01); *G06K 9/00771* (2013.01); *G06T 7/0004* (2013.01); *G06T 7/292* (2017.01); *G06K 2209/19* (2013.01); *G06T 2207/10016* (2013.01); *G06T 2207/10028* (2013.01); *G06T 2207/10048* (2013.01);
(Continued)

(58) Field of Classification Search
CPC ....... G06T 7/246; G06T 7/292; G06T 7/0004; G06T 2207/30164; G06T 2207/10016; G06T 2207/20076; G06T 2207/10048; G06T 2207/10028; G05J 5/10; G01S 17/66; G06K 9/00771; G06K 2209/19; G01J 5/10; H04N 5/04
USPC .......................................................... 348/94
See application file for complete search history.

(56) References Cited

U.S. PATENT DOCUMENTS

2012/0062725 A1* 3/2012 Wampler, II ............. G01V 8/12
  348/86
2015/0092040 A1 4/2015 Chen et al.
(Continued)

OTHER PUBLICATIONS

Hasan Bank et al.; "Temporal Logic (TL)—Based Autonomy for Smart Manufacturing Systems"; ScienceDirect; 2018; pp. 1221-1229.
(Continued)

*Primary Examiner* — Tung T Vo

(57) ABSTRACT

Systems, techniques, and computer-program products are provided for tracking and traceability of parts of a finished product. In some embodiments, the tracking and traceability generates streams of semantic data obtained from an imaging sensor system that records the execution of a manufacturing process in industrial equipment. The execution of the manufacturing process yields a finished product from initial materials and/or parts. The tracking and traceability also implements artificial reasoning about the execution of the manufacturing process to generate assertions that characterize the execution of the manufacturing process. Semantic data and assertions can be aggregated into a digital trace record that tracks a defined component of the finished product throughout the execution of the manufacturing process and permit tracing the component to a defined event within the manufacturing process.

20 Claims, 8 Drawing Sheets

(52) U.S. Cl.
CPC ............ *G06T 2207/20076* (2013.01); *G06T 2207/30164* (2013.01); *H04N 5/04* (2013.01)

(56) References Cited

U.S. PATENT DOCUMENTS

| | | | |
|---|---|---|---|
| 2016/0034547 A1* | 2/2016 | Lerios | G06F 16/254 |
| | | | 707/602 |
| 2017/0236262 A1 | 8/2017 | Ohnuki et al. | |
| 2018/0178867 A1* | 6/2018 | Sadri | B23P 19/04 |

OTHER PUBLICATIONS

Kumari Moothedath Chandran et al. "A Spatio-Temporal Network Representation forManufacturing"; vol. 2; 2015, pp. 459-570.
EP Search Report dated Jan. 15, 2020; European patent application 19 196 261.2; 5 pages.
Alexander Bannat et al: "Artificial Cognition in Production Systems"; IEEE Transactions on Automation Science and Engineering, IEEE Service Center, New York, NY, US, vol. 8, No. 1; Jan. 1, 2011 (Jan. 1, 2011), pp. 148-174; XP011340970; ISSN: 1545 -5955, DOI : 10 . 1109/TASE.2010.
Pham D T et al: "Machine-learning techniques and their applications in manufacturing", Institution of Mechanical Engineers; Proceedings. Journal of Engineering Manufacture, Mechanical Engineering Publications Ltd. London, GB, vol. 219, No. 5, Jan. 1, 2005 (Jan. 1, 2005), pp. 395-412; XP008119893; ISSN: 0954-4054, DOI: 10.1243/095440505X32274.
Anis Ben Khedher et al: "Integration between MES and Product Lifecycle Management"; Emerging Technologies&Factory Automation (ETFA), 2011 IEEE 16th Conference on, IEEE; Sep. 5, 2011 (Sep. 5, 2011), pp. 1-8; XP031961312; DOI: 10.1109/ETFA.2011. 6058993; ISBN: 978-1-4577-0017-0.

* cited by examiner

TRACKING AND TRACEABILITY OF PARTS OF A PRODUCT

BACKGROUND

In manufacturing industries, tracking and traceability of components over a production lifecycle, from raw parts to a final finished product, is critical for efficient production and supply management. In some industrial sectors, such as the automotive sector, traceability of parts from finished products is a legal requirement because it allows manufacturers to pinpoint the products in the case of any recall or other defects after the manufacturing processes. Therefore, tracking and traceability is an important and necessary function in most manufacturing execution system (MES) and production lifecycle management (PLM) system.

Commonplace technologies that implement tracking and traceability functions mostly rely on human manual sorting and/or labeling; scanning of barcodes; laser engraving on parts; attaching radio-frequency identification (RFID) tags; and the like. In some instances, rudimentary interfaces and solutions are available in some PLM systems and MESs to record and track added tags or barcodes within a database, to enable components tracking and traceability while the parts are moving on the production line until becoming a finished product.

Therefore, much remains to be improved in technologies that implement tracking and traceability of components over a production lifecycle.

BRIEF DESCRIPTION OF THE DRAWINGS

The accompanying drawings are an integral part of the disclosure and are incorporated into the present specification. The drawings, which are not drawn to scale, illustrate example embodiments of the disclosure and, in conjunction with the description and claims, serve to explain at least in part various principles, features, or aspects of the disclosure. Some embodiments of the disclosure are described more fully below with reference to the accompanying drawings. However, various aspects of the disclosure can be implemented in many different forms and should not be construed as being limited to the implementations set forth herein. Like numbers refer to like, but not necessarily the same or identical, elements throughout.

DETAILED DESCRIPTION

Figure 1:
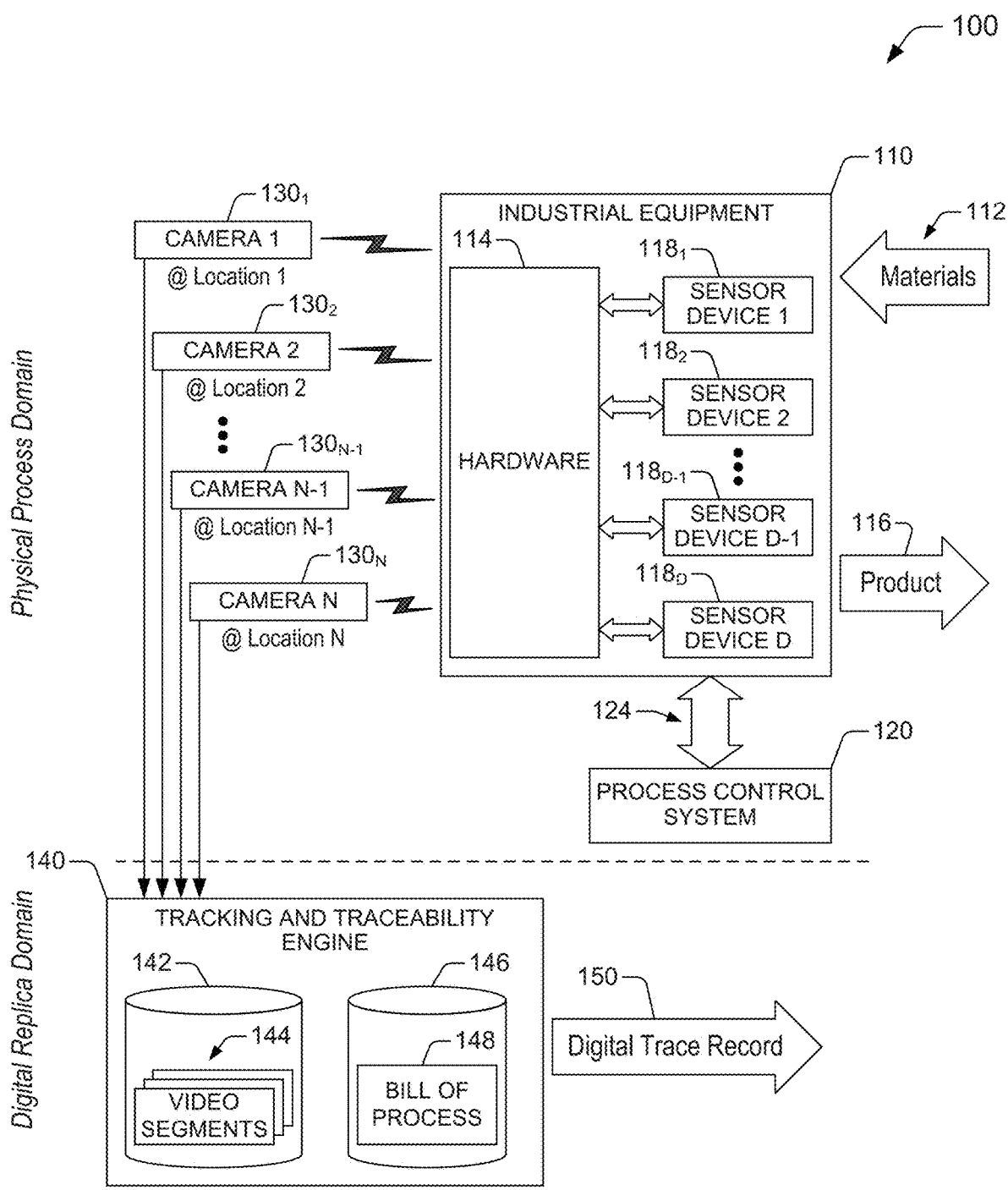
FIG. 1 presents an example of an operational environment for tracking and traceability of components of a product, in accordance with one or more embodiments of the disclosure.

The disclosure recognizes and addresses, in at least some embodiments, the lack of efficient and reliable tracking and traceability in commonplace manufacturing systems. Component tracking and traceability via additional tags or barcodes generally is a time consuming, labor intensive and low skill task. It is intrusive, since additional tags needs to be attached or engraved. It also slows down the overall production process due to the requirement of additional procedures. To compound the issue, rather than being optional, in most industries tracking and traceability of component is mandatory. As such, the disclosure provides technologies that, individually or in combination, provide efficient tracking and traceability processes by means of automation and digital replicas of physical manufacturing processes to form products. More specifically, some embodiments of the disclosure provide a digital-based approach that integrates imaging sensor devices and machine-vision technology seamlessly into a manufacturing system to track constituent parts of a finished product. The disclosure, however, is not limited in that respect, and in some embodiments, imaging sensor device and/or monitoring devices (such as a microphones and/or haptic devices) and related perception technology (e.g., aural-recognition technology) can be implemented. The digital-based approach generates a digital trace record that aggregates temporal information, spatial information, and artificial reasoning assertions that characterize a complete cycle of production of a product in industrial equipment. The digital trace record can be generated without reliance on the commonplace intrusive, time consuming tag-based and barcode-based approaches.

As is described in greater detail below, embodiments of the disclosure include systems, techniques, and computer-program products that, individually or in combination, permit implementing the generation of digital trace records in accordance with aspects described herein. More specifically, yet not exclusively, at least some embodiments of the disclosure permit or otherwise facilitate implementing tracking and traceability techniques that integrate streams of semantic data obtained from an imaging sensor system with artificial reasoning in order to generate rich information that characterizes a sequence of jobs that yield a finished product from initial materials and/or parts.

Accordingly, embodiments of the disclosure can utilize or otherwise leverage perception about critical objects, machines, time stamps, spatial stamps, and associate probabilistic information, and can carry relevant, rich information across numerous components of a digital twin of the manufacturing process to form a finished product. Rich information in the digital twin can permit or otherwise facilitate efficient reliable automation control, superior quality of service (QoS), and operational integrity.

None of the tracking and traceability intelligence contained in the generation of digital trace records relies on the traditional costly and inflexible installation and management of physical tags (e.g., RFID tags) and/or barcode solutions. Indeed, a digital trace record of this disclosure leverages low-cost cameras and a tracking and traceability platform, for example, that can be a part of the digital twin of the manufacturing process to form a finished product. As such, embodiments of this disclosure can provide numerous technical improvements and benefits over conventional technologies for production coordination, efficiency, and integrity. For example, embodiments of the disclosure constitute a passive sensor-based technology that foregoes any attachment of physical tags, labels having barcodes, RFID tags and any type of processing directed to identifying a constituent part of a product. Therefore, embodiments of the disclosure permit implementing manufacturing processes that are superior to conventional manufacturing processes.

More concretely, without relying on the attachment or the integration of physical identifiers of constituent parts, embodiments of the disclosure permit implementing manufacturing products that contain operational expenses and other costs. Further, by eradicating the attachment of tags and the subsequent scanning of tags in the manufacturing process, embodiments of the disclosure permit other efficiencies beyond expediting the manufacture of a product. Without the handling of physical tags, embodiments of the disclosure permit manufacturing processes that, at a minimum, are consume less time than conventional manufacturing processes.

As another example, with a complete synchronized video recording of the manufacturing/assembling process, the tracking and traceability can be achieved accurately by analyzing videos and correlating the videos with manufacturing process. In yet another example, the video recordings and corresponding traceability results not only track the parts, but also incorporate important manufacturing information of how a product was made. Such information can be critical information, in some cases, related to the product defects. Hence, this can help the manufacturer to track defects and issue recalls more accurately.

With reference to the drawings, FIG. 1 presents an example of an operational environment 100 for tracking and traceability of components of a product, in accordance with one or more embodiments of the disclosure. The illustrated operational environment 100 includes industrial equipment 110 having hardware 114 that permits of otherwise facilitates specific functionality. The industrial equipment 110 can include a group of machines and can implement or perform a defined industrial process that permits forming a product 116 from raw materials/parts 112. The product 116 can have the necessary components to provide one or more desired functionality. Thus, the product 116 can be referred to as a finished product. The product 116 can be embodied in an object across a range of industries—e.g., aircraft; an automobile; an agricultural machine; a turbine; an engine; an industrial vibrator (e.g., a vibratory feeder apparatus); a consumer electronics device; or the like. A machine that constitutes the hardware 114 can have a defined group of capabilities (or skills) that permit the machine to execute a defined job. Execution of the defined job results in a constituent product of product 116 or, depending on the machine, the finished product 116.

The defined industrial process includes a sequence of defined operations (or steps) $S_1, S_2, \ldots S_M$ (with M a natural number) performed by respective machines within the hardware 114. Each one of the sequence of defined operations $S_k$ (k=1, 2, ... M) can include other operations $\sigma_1, \sigma_2, \ldots \sigma_m$ (with m a natural number less than M). Execution (or performance) of the industrial process can be automated. To that end, a group of sensor devices can be integrated into or otherwise coupled to the hardware 114 to collect data indicative or otherwise representative of an operational state of the industrial equipment 110. In some embodiments, the group of sensor devices can be homogeneous, including several sensor devices of a same type (e.g., pressure meters or temperature meters). In other embodiments, the group of sensor devices can be heterogeneous, where a first subset of the group of sensor devices corresponds to sensor devices of a first type and a second subset of the group of sensor devices corresponds to sensor devices of a second type. For instance, such a group of sensor devices can include pressure meter(s) and temperature meter(s). As is illustrated in FIG. 1, the group of sensor devices includes a sensor device $118_1$, a second device $118_2, \ldots$, a sensor device D-1 $118_{D-1}$, and a sensor device D $118_D$. Here D is a natural number greater than unity. Open, block arrows linking respective sensors and the hardware 114 generically depict integration of a sensor device into the hardware 114 or coupling of the sensor device to the hardware 114.

Further, to automate an industrial process that can be implemented by the industrial equipment 110, a process control system 120 can be functionally coupled (e.g., communicatively coupled, electrically coupled, electromagnetically coupled, and/or electromechanically coupled) to the industrial equipment 110. A communication architecture 124 can permit or otherwise facilitate the exchange of information (data, metadata, and/or signaling) between the process control system 120 and the industrial equipment 110. The communication architecture 124 can be embodied in or can include several types of network elements, including base stations; router devices; switch devices; server devices; aggregator devices; bus architectures; a combination of the foregoing; or the like. One or more of the bus architectures can include an industrial bus architecture, such as an Ethernet-based industrial bus, a controller area network (CAN) bus, a Modbus, other types of fieldbus architectures, or the like.

The process control system 120 can implement control logic for the automation of an industrial process that can be performed by the industrial equipment 110. In some embodiments, the process control system 120 also can apply other types of rules that dictate physical access to industrial equipment, implementation of a defined sequence of commands that operate the industrial equipment 110, a combination thereof, or the like.

To that end, the process control system 120 can operate in real time, collecting or otherwise receiving observed data from the sensor devices $118_1$-$118_D$. The process control system 120 can implement the control logic and/or other control algorithms (or processes) using, in some instances, the observed data. Based at least on the implemented logic and/or algorithms, the process control system 120 can send execution commands and/or setpoints to actuator devices (not depicted) or other types of controller devices (not depicted) that constitute the process control system 120. The process control system 120 also can include one or more human-machine interfaces (HMIs; not depicted) that can present (visually or aurally) real-time status or nearly real-time status to operators. An HMI also can receive commands from operators. In some embodiments, the process control system 120 can be embodied in or can include a distributed control system (DCS) or and supervisory control and data acquisition (SCADA) system.

The industrial equipment 110 can have a defined complexity (architectural or otherwise) based at least in part on the type of industry that the industrial equipment 110 pertains. For an industry, the complexity of the industrial equipment 110 also can be based at least on the types of industrial processes that the industrial equipment 110 can implement. In some embodiments, the industrial equipment 110 can be specific to the manufacturing industry. In other embodiments, the industrial equipment 110 can be specific to the automotive industry. This disclosure, however, is not limited in that respect and the principles and practical elements of the disclosure can be applied to any industrial equipment that implements an industrial process that can be automated.

The illustrated operational environment 100 includes a group of cameras, including a camera 1 $130_1$, a camera 2 $130_2$, ... a camera N-1 $130_{N-1}$, and a camera N $130_N$. As mentioned, the disclosure is not limited to stationary cameras and in addition, or as an alternative, other imaging devices (e.g., infrared sensor devices, light detection and ranging (LIDAR) devices, or the like); mobile unmanned robots (e.g., drones) equipped with imaging devices; and/or other types of monitoring devices (e.g., microphones, haptic devices, and/or other sensory devices) that collect ambient information can be included in the operational environment 100. In one embodiment, the operational environment 100 can include a mobile unmanned robot (not depicted in FIG. 1) fitted with an imaging sensor and/or a microphone can traverse a facility that houses the industrial equipment 110 to generate imaging data and/or audio data during the execution of a manufacturing process. Such a robot can move autonomously or controlled by the process control system 120. For instance, the process control system 120 can be functionally coupled wirelessly to the mobile unmanned robot to direct the motion of the robot. The process control system 120 can utilized or otherwise rely at least on process logic (e.g., a manufacturing process plan) to direct such motion. The mobile unmanned robot also can be wirelessly coupled to the tracking and traceability engine 140 to supply imaging data and/or audio data.

In some embodiments, the group of cameras can generate imaging data indicative of at least some portions of the execution of the industrial process performed by the industrial equipment 110. To that end, each camera of the group of cameras is positioned at a defined location within the footprint of a plant, factory, warehouse, or other facility that houses the industrial equipment 110. For instance, each one of cameras $130_1$-$130_N$ can be positioned at a location within an assembly line on which the machines of hardware 114 are deployed. For example, the group of cameras can be deployed in proximity or at assembly points, where in each assembly point, multiple parts can be assembled into a constitute (or intermediate) assembly. Specifically, a camera can be positioned either near an entry region of the assembly point or near an exit region of the assembly point location of a camera of the group of cameras can be before or after a certain assembly point.

Further, or in other embodiments, audio sensing devices (such as microphones, not shown in FIG. 1) can be deployed in combination with cameras $130_1$-$130_N$ to generate audio segments indicative of at least some portions of the execution of the industrial process performed by the industrial equipment 110. Such audio segments also can be referred to as audio signatures, in some instances. The audio sensing devices can be deployed at respective defined locations within the footprint of the plan factory, warehouse, or other type of facility that houses the industrial equipment 110. At least some (or, in some embodiments, each one) of the audio sensing devices can be collocated with the group of cameras including cameras $130_1$-$130_N$.

Figure 2:
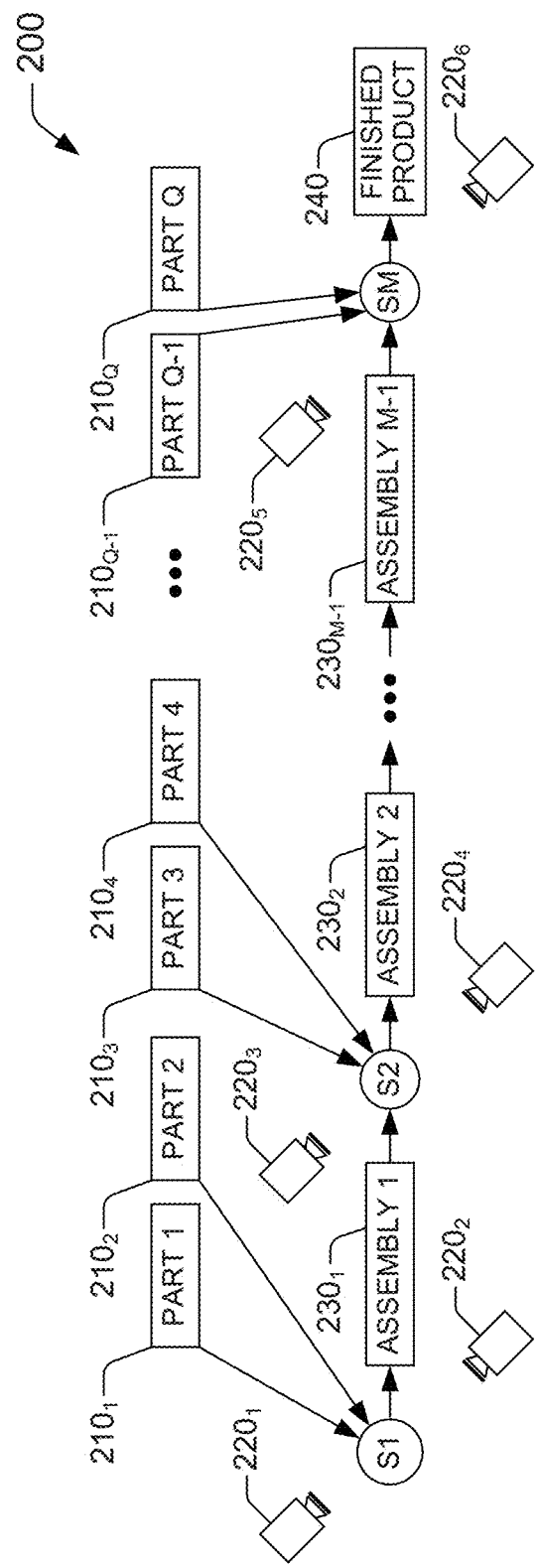
FIG. 2 illustrates a schematic diagram of recordation of video segments that permit or otherwise facilitate tracking and traceability of components of a product, in accordance with one or more embodiments of the disclosure.

The group of cameras can record some or all the parts from a batch (e.g., materials 112) as the parts traverse an assembly line that include the hardware 114. As such, some of the cameras can record input of parts (and, in some instances, some constituent assemblies) into assembly points. Other cameras can record output of constituent assemblies as processed output moves out of assembly points. FIG. 2 illustrates a schematic diagram 200 of recordation of video segments of execution of an example manufacture process plan, in accordance with aspects of this disclosure. As mentioned, other monitoring devices (e.g., mobile unmanned robots fitted with sensory devices; microphones; haptic devices; a combination thereof; or the like) can be included in the schematic diagram 200 in order to generate imaging data, audio data, and/or other type of data indicative of the execution of the manufacture process plan. A combination of such different types of data can be referred to as monitoring information. The manufacture process plan includes of defined procedures and rules that establish the manner of forming the finished product 116 from initial materials 112. More concretely, a camera $220_1$ can be positioned near a first machine (or a first station S1 including the first machine) that executes a first step S1 of the manufacturing process. The camera $220_1$ can generate imaging data (e.g., a collection of digital image frames) of a part 1 $210_1$ and a part 2 $210_2$ as those parts enter the first machine. A camera $220_2$ also can be positioned in proximity of the first machine. The camera $220_2$ can be positioned to generate imaging data indicative of a constituent assembly 1 $230_1$ that is formed by the first machine from part 1 $210_1$ and part 2 $210_2$. The camera $220_2$ can record the traversal of the assembly 1 $230_1$ to a second machine (or a second station S2 including the second machine).

A camera $220_3$ can be positioned in proximity of the second machine and can generate imaging data of a part 3 $210_3$ and a part 4 $210_4$ as those parts enter the second machine. Another camera $220_4$ can be positioned in proximity to the second machine and can generate imaging data of a constituent assembly 2 $230_2$ that is formed by the second machine from part 3 $210_3$ and part 4 $210_4$. The camera $220_4$ can record the traversal of the assembly 2 $230_2$ to another machine as the automated execution of the manufacturing process continues.

A camera $220_5$ can be positioned near a machine (or station SM that includes the machine) that receives a constitute assembly M-1 $230_{M-1}$, a part $210_{Q-1}$, and a part Q $210_Q$. Such a machine can execute a job that results in a finished product 240. A camera $220_6$ positioned near the exit of the machine can generate imaging data of the finished product 240.

Figure 3:
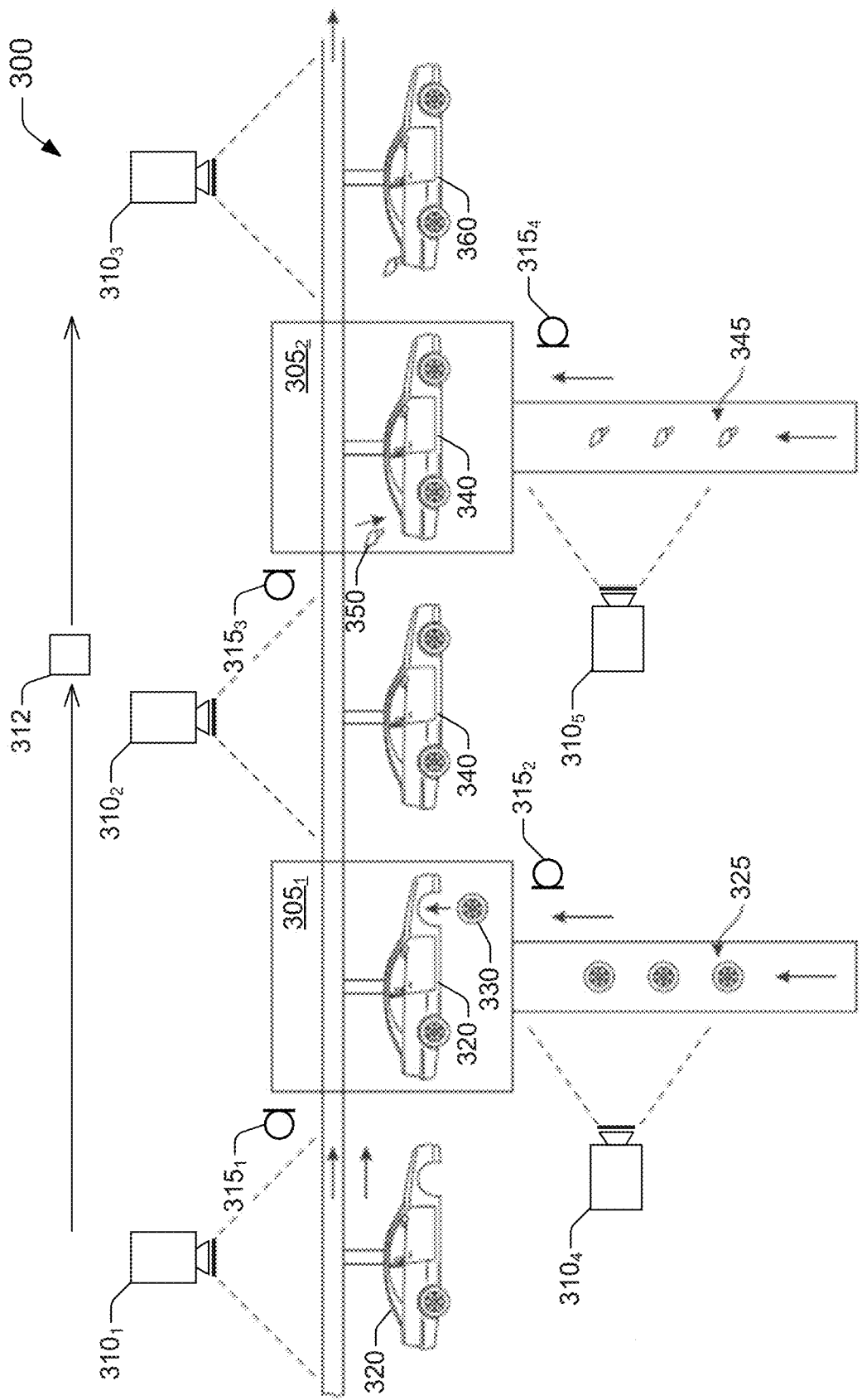
FIG. 3 presents a schematic diagram of an example of a plant that performs an automobile assembly process, in accordance with one or more embodiments of the disclosure. Cameras and other monitoring devices are positioned at defined locations in the plant to record the performance of the automobile assembly process. A roaming monitoring device also is included.

As a more concrete illustration, FIG. 3 illustrates a schematic diagram of a simplified automobile assembly line where two stages of a process to assemble an automobile are executed. Cameras $310_1$, $310_2$, $310_3$, $310_4$, and $310_5$ can be positioned at selected locations to synchronously record the execution of such stages of the process. In some embodiments, in addition or as an alternative to the one or more of such cameras, a mobile unmanned robot 312 fitted with a camera and/or a microphone can traverse (represented with open-arrowhead lines) at least portions of the assembly line to generate imaging data and/or audio data during the assembly of the automobile. Such a robot can move autonomously or controlled by a process control system (such as process control system 120). Microphones $315_1$, $315_2$, $315_3$, and $315_4$ also can be positioned at other selected locations or, in some embodiments, such microphones can be collocated with respective cameras. Such cameras generate imaging data corresponding to various operations in the manufacturing process to assemble an automobile. The microphones generate audio data corresponding to at least some of such operations. More specifically, a first stage of the process corresponds to the assembly of front wheels. Such a stage can be implemented in a station $305_1$. A camera $310_1$ can be positioned at a first location near the station $305_1$ to record entry of a first assembly 320 in the station $305_1$. A second camera $310_4$ also can be placed near the station $305_1$ to record entry of first parts 325 (e.g., wheels) in the station $305_1$. During execution of the process, a wheel 330 can be mounted to an axle assembly (not shown) in the first assembly 320. A second assembly 340 can exit the station $305_1$. Thus, a camera $310_2$ placed near the station $305_1$ can record the output of the station $305_1$.

A second stage of the process is the assembly of a spoiler assembly. A station $305_2$ (or machine(s) therein) can implement the second stage. The camera $310_2$ also can be in proximity to a second station $305_2$ and can record entry of the second assembly 340 in the station $305_2$. A camera $310_5$ also can be placed in proximity to the station $305_2$ and can record entry of second parts 345 (spoiler assemblies) in such a station. Execution of the second stage by the station $305_2$ can yield a third assembly 360 (which can be a finished automobile). A camera $310_3$ can record output of the station $305_2$.

With further reference to FIG. 1, the industrial equipment 110, the communication architecture 124, the process control system 120, and the cameras $130_1$-$130_N$ (and, in some embodiments, other imaging sensor devices) constitute a physical process domain in which an industrial process is implemented. As is illustrated in FIG. 1, the operational environment 100 also includes a digital replica domain that includes a computer-implemented environment onto which an industrial process (e.g., an entire production cycle) in the physical process domain can be mapped. The digital replica domain includes and utilizes numerous modelling, computational, and artificial intelligence (AI) technologies that, individually or in combination, can permit implementing a digital replica of a physical industrial process. Such a digital replica embodies or constitutes a dynamic simulation model of the physical industrial process.

High-performance computing can permit or otherwise facilitate executing a digital replica. To that end, the digital replica domain can include a computing system that can receive a model of the industrial process that can be automated by the process control system 120 and implemented, at least partially, by the industrial equipment 110. As such, the computing system can receive data, metadata, and/or code instructions (which can constitute libraries and/or other types of software components) that can permit simulating defined aspects of the industrial process in the physical process domain. The computing system can execute the digital replica.

Such a digital replica can be referred to as a "digital twin" and embodies or constitutes a dynamic simulation model of the physical process. In some embodiments, the digital replica integrates at least some of the physics of the physical process; a logic that controls the physical process; and a simulation model of the physical process. The digital replica can utilize or otherwise leverage data-driven approaches that utilize machine-learning based methods. In addition, or in some embodiments, the digital replica can utilize or otherwise leverage model-driven approaches based on physical phenomena underlying an industrial process and rules of such process. Accordingly, in some instances, by incorporating a model of the physical industrial process, the digital replica can be synchronized with its physical counterpart in nearly real-time. The digital replica also permits or otherwise facilitates simulating and evaluating a state of the process before the state is achieved in the counterpart physical system. The digital twin can nearly continuously learn and can update itself from multiple sources to refine its real-time representation of the physical process.

As is illustrated, the digital replica domain includes a tracking and traceability engine 140 that can permit implementing tracking and traceability processes in accordance with aspects of this disclosure. To that end, in one aspect, the tracking and traceability engine 140 can receive a collection of video segments from respective cameras, e.g., cameras $130_1$-$130_N$. As mentioned, the video segments record the execution of the industrial process that permits forming the finished product 116 from materials 112. In some embodiments, as is illustrated in the block diagram 400 shown in FIG. 4A, the tracking and traceability engine can include an ingestion module 410 that can receive imaging information indicative of the video segments generated by the cameras. For instance, for each one of the cameras $130_1$-$130_N$, the ingestion module 410 can receive first information indicative of digital frames generated by a respective camera. Such information can include, for example, a timestamp information and/or other type of metadata (e.g., camera location) that characterized a digital frame.

Figure 4A:
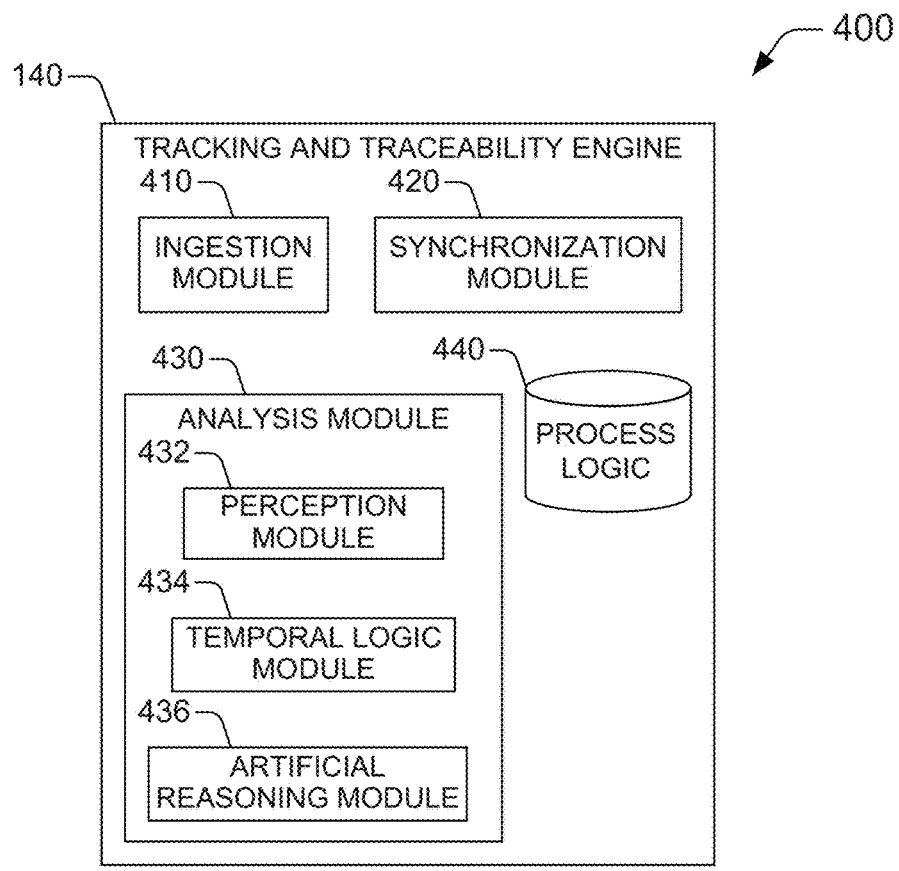
FIG. 4A presents an example of a system for tracking and traceability of parts of a product, in accordance with one or more embodiments of the disclosure.

As is also illustrated in the embodiment in FIG. 4A, the tracking and traceability engine 140 also can include a synchronization module 420 that can aggregate the imaging information received by the ingestion module 410. Accordingly, in one aspect, the synchronization module 420 can synchronize the collection of video segments relative to a starting instant of a manufacture process plan executed by the industrial equipment 110. In addition, in a synchronization aspect, the synchronization module 420 also can process the imaging information to collate the received video segments into a single video record of the execution of the manufacture process plan—defined procedures and rules that establish the manner of forming a finished product from initial parts.

With further reference to FIG. 1, the tracking and traceability engine 140 can retain video segments (as received and synchronized) in one or more memory devices 142 within one or more data structures 144 (generically referred to as video segments 144). In addition, the tracking and traceability engine 140 can retain one or more product bills of process in one or more memory devices 146 within one or more data structures 148 (generically referred to as bill of process 148). A product bill of process (BOP) can include a manufacture process plan to form the product 116 from the materials 112, for example. The tracking and traceability engine 140 can analyze the synchronized video segments in conjunction with the manufacture process plan. As such, temporal-spatial information related to all parts (or, in some embodiments, at least some parts) assembled into the finished product 116 can be obtained. Further, as is disclosed herein, the tracking and traceability engine 140 also can perform artificial reasoning. In some embodiments, the artificial reasoning utilizes semantic perception information from the analysis of the video segments and prior knowledge (e.g., rules) of the manufacturing process to generate assertions that characterize the execution of the manufacture process plan.

Based at least on the semantic perception information and the reasoning, the tracking and traceability engine 140 can generate a digital trace record 150 for the finished product 116. The digital trace record 150 can be reconstructed to accurately track and trace all the parts (or, in some embodiments, at least some parts) for the finished product 116. None of the tracking and traceability intelligence contained in the generation of the digital trace record 150 relies on the traditional costly and inflexible installation and management of physical tags (e.g., RFID tags) and/or barcode solutions. Indeed, the digital trace record 150 can leverage low-cost cameras and a tracking and traceability engine 140 that can be a part of a digital twin of the manufacturing process to form the finished product 116. As such, the digital trace record 150 can be ported to and utilized in numerous extant MES/PLM tracking and tracing applications in the digital replica domain.

In scenarios in which an abnormal condition has been identified in the finished product 116, the digital trace record 150 can permit or otherwise facilitate root cause analysis. For example, an analysis of the digital trace record 150 permits or otherwise facilitates identifying a point of error in the execution of a manufacturing process. In addition, or in some instances, analysis of the digital trace record 150 can permit identifying inadequate procedures and/or control logic that cause the finished product 116 to be faulty. Accordingly, in some aspects, defects can be found and traced, information can be visualized through operator interfaces (SCADA, HMI), and/or overall production process can be ensured to be compliant with extant regulations.

More concretely, in some embodiments, as is illustrated in FIG. 4A, the tracking and traceability engine 140 can include an analysis module 430 that can analyze a collection of synchronized video segments in conjunction with a manufacture process plan. In addition, or in some embodiments, the analysis module 430 can analyze a collection of audio segments in conjunction with the manufacture process plan. For example, the analysis component 430 can perform a semantic perception analysis. As such, the analysis component 430 can generate statements or other types of conclusions corresponding to observations about the existence of defined objects in defined locations at specified times or over time intervals. For example, such observations are probabilistic and correspond to first features indicative of respective objects in one or more video frames and second features indicative of a location associated with the video frame(s). In one example, such a location can be the location of a camera or imaging sensor that generated the video frame(s). In another example, such a location can correspond to a location gleaned from at least one of the video frame(s). In yet another example, said location can correspond to the location of a microphone or another type of ambient-audio sensing device that generates audio segments during execution of the manufacture process plan.

Accordingly, in some embodiments, the analysis module 430 can include a perception module 432, such as a machine-vision module (not depicted), that can apply one or more machine-vision techniques coupled with a machine-learning technique a video frame of a synchronized video segment to generate a group of observations for the video frame. This disclosure is not limited to image processing and feature recognition using machine-vision techniques. The perception module 432 can, in some embodiments, apply other techniques to identify defined sounds or sound sequences, such as human utterances or machine-originated sounds. The analysis module 430 can apply numerous machine-learning techniques that can rely on a data-driven model of the digital twin corresponding to a manufacture process plan that can be performed by the industrial equipment 110. The perception module 432 can utilize or otherwise leverage, for example, information retained in one or more data structures 440 (generically referred to as process logic 440) within one or more memory devices in the tracking and traceability engine 140. At least a portion of such information can be indicative or otherwise representative of a manufacturing process that can be executed by the industrial equipment 110. In addition, in some embodiments, such machine-learning techniques also can be retained in the process logic 440.

The data-driven model of the digital twin can be generated by using or otherwise leveraging historical input data, historical output data, state information (e.g., data, metadata, and/or signaling) of the industrial process, a combination thereof, or the like, to determine a set of suitable parameters of defined model (e.g., a regression model, a convolutional network, a generative adversarial network, or the like) that solve a defined optimization problem with respect to an objective function. For instance, the data-driven model can be embodied in or can include a machine learning model based on a deep convolutional neural network, Thus, the analysis module 430 can utilize or otherwise leverage the deep convolutional neural network for object detection in a video frame. As such, observations generated by the analysis module 430 (via the machine-vision module, for example) can be probabilistic. For example, at a defined location, the machine-vision module "perceives" an observation with a likelihood of 85%.

In addition, or in some embodiments, the analysis module 430 can disambiguate conflicting observations by applying a probabilistic graphical model (PGM) reasoning module that can generate an inference that resolve a contradiction on observations. Similarly, in scenarios in which occlusion causes an observation to be inconsistent across a series of video frames, the PGM reasoning module can generate an inference regarding an occluded object or other type of missing information.

The analysis module 430 can utilize an actual timeline for the implementation of the manufacture process plan to form the finished product 116 and/or location information in order to generate a statement corresponding to an observation at a defined time (or period of time) and a defined location. The statements also are probabilistic because the probabilistic nature of the observations on which the statements are based upon. As a result, amongst many others, the analysis module 430 can generate streams of semantic data—namely, a time series of defined statements corresponding to observations about the existence of defined objects in defined locations at specified times or periods of time.

As mentioned, the hardware 114 in the operational environment 100 illustrated in FIG. 1 can be distributed across a factory floor, for example. Within a semantic perception analysis, a state of the factory floor can be viewed as a blackboard that contains dynamic statements or conclusions about elementary objects that are true over a time interval encompassing a recent past to present or over defined time intervals (e.g., a processing time for completion of a defined job at a define machine included in the hardware 114).

Further, as mentioned, a manufacture process plan (or manufacturing process) includes the operations and rules that define a dynamics of processing objects. Such a plan can constitute the basis for the analysis component 430 to generate knowledge from a process model representing the logic for processing objects (transformations, assembly, etc.). More simply, the semantics of a factory automation system (e.g., the industrial equipment 110 and the process control system 120) can be viewed as a state machine over defined states and transitions between the states. Such states can be defined in terms of stochastic variables of interest, for example.

The knowledge that the analysis module 430 generates by applying a joint analysis of a synchronized video segment and a manufacture process plan can be expressed in signal temporal logic (STL). As is disclosed herein, STL provides a mathematical description language used to specify a behavior of the industrial equipment 110 over discrete time steps during the execution of a manufacturing process. In one aspect, STL permits specifying formulae describing a set of paths including different state transitions. For example, STL can be used to specify a condition which can eventually be true, or a condition which holds until a specified state is reached. In some aspects, STL permits or otherwise facilitates specifying and reasoning about patterns that a timed assembly system satisfies. Expressing knowledge in terms of signal temporal logic can be accomplished regardless of the manner of generating knowledge (e.g., automatic generation or semi-automatic generation). Elements of the STL formalism can be retained, for example, in process logic 440. The disclose, however, is not limited in that respect and, in some embodiments, elements of the STL formalism can be retained in one or more other data structures within one or more memory devices integrated into the tracking and traceability engine 140 or functionally coupled thereto.

Therefore, the analysis module 430 can include a temporal logic module 434 that can implement tracking by applying deductive reasoning, using at least the signal temporal logic (STL), to both semantic statements and knowledge. More specifically, in some embodiments, the temporal logic module 434 can perform reasoning using at least probabilistic STL. Probabilities provide likelihood in the time that an event occurs (e.g., a probability is ascribed to such a time) and further provide certainty of (or defined) logical assertions. In some scenarios, STL can permit or otherwise facilitate reasoning about the order and timing of discrete events. For instance, in job k, "Part 1" and "Part 2" are assembled together by Machine 1 (M1), over an interval of time T, to define the output event showing a component "Assembly 1". Assembly 1 will be identified on the conveyor belt "output 1" of M1. To that end, for example, the temporal logic module 434 can utilize or otherwise leverage information retained in the process logic 440.

In one aspect, the signal temporal logic formalism can automatically assess if a model satisfies required properties in order to infer information that can be used to track all consumed parts (or at least some of the consumed parts) and newly created assemblies (or constituent products). The tracking and traceability engine 140 can perform such an assessment as observations (e.g., sensor data, video segments, and the like) are accumulated, starting from an initial state.

Further, probabilistic STL in accordance with this disclosure embodies or constitutes a declarative knowledge representation formalism. Specifically, declarative knowledge can include an STL formula consists of Boolean and temporal operations on predicates. The syntax of well-formed STL formulae $\Phi$ is:

$$\Phi ::= \psi \mid \neg \psi \mid \Phi \wedge \psi \mid \Phi \vee \psi \mid G_{[a,b]}\psi \mid \psi U_{[a,b]}\psi \mid F_{[a,b]}\psi \qquad (1)$$

where $\neg$, $\wedge$, $\vee$ are logical operators that correspond to negation, conjunction, and disjunction, respectively, $\Phi$ and $\psi$ are STL formulae, G represents a globally operator (the argument formula "always" holds on time interval [a,b]), F represents an eventually operator (the argument formula "eventually" holds on time interval [a,b]), and U represents an until operator (the header formula holds "until" the argument formula is satisfied on time interval [a,b]). For example, $\zeta = G_{[a,b]}\psi$ specifies signal $\zeta$ stating that $\psi$ must hold in the interval, $t \in [a, b]$ of signal $\zeta$. A top level well-formed formula $\zeta$ is satisfied at time t ($\zeta(t)=1$) if and only if the observations across time, over a finite horizon before t induce the satisfaction of the formula.

Formulae such as atomic observations, "successor over time of a property holds", "machine/part condition is true until property is true", disjunction and negations of other formulae etc. result in well-formed abstractions that can represent tracking specifications or required properties. For example, if signals indicating that component parts are available in some interval [a,b] at the input of an assembly machine, then the result of the assembly of the parts is also available over an interval [a+c,b+c] with a high likelihood.

Therefore, STL can provide a formal language for specifying functional properties of the model, in the form of temporal formulae for expressing temporal statements, and a deductive system for reasoning about time. In addition, STL can specify a mathematical structure extracted from the operation of the hardware 114 (e.g. an assembly machine). In addition, or in some embodiments, the tracking and traceability engine 140 can leverage probabilistic STL to eliminate uncertainties in output sensors (e.g., sensors $118_1$-$118_D$) that probe a state of the industrial equipment 110. For instance, in one embodiment, analysis module 430 can implement predicate evaluation using probabilistic representational elements of a PGM for monitoring the industrial equipment 110 over time. The probabilistic STL assertions represent input evidence to a graphical model that can assemble the likelihoods of the final conclusions.

Further, or in some embodiments, the temporal logic module can apply goal-driven reasoning to discover potential missteps during the manufacture of the finished product 116. Either one of deductive reasoning or goal-driven reasoning can follow the planned progress on the manufacturing line of the manufacture process plan to form the finished product 116, generating explicit additional statement or conclusion (either referred to facts) that can be used for tracking and tracing.

Deductive reasoning and/or goal-driven reasoning implemented by the tracking and traceability engine 140 can account for the fact that tracking information evolves with time and that parts of the tracking information can be missing (e.g., hidden) or can otherwise be uncertain or imprecise.

As mentioned, location information can be integrated into or otherwise associated with the imaging information received from a group of cameras (e.g., camera 1 $130_1$ to camera N $130_N$) and/or other types of imaging sensors. Thus, the analysis module 140 can utilize a spatial knowledge representation based on topology and Euclidean geometry models to create quantitative representations of locations within a plant floor or another type of footprint of the hardware 114. In addition, or in other embodiments, the spatial knowledge representation can be based on deictic symbolic representations applicable at defined positions. This explicitly can refer to "here" and "now," where the spatial location and temporal dimension are defined by context.

Using at least in part the one or more streams of semantic data semantic perception analysis described herein, the tracking and traceability engine 140 can formally represent temporal facts and spatial facts, events and dependencies (related to process timing, duration, location of machines and parts, location where products are made, etc.), and can reason about the process dynamics and factual constraints in a manner that is consistent across time and space. Accordingly, again with reference to FIG. 1, the digital record trace 150 can include statements from semantic perception and other statements from deductive reasoning and/or goal-driven reasoning.

Figure 4B:
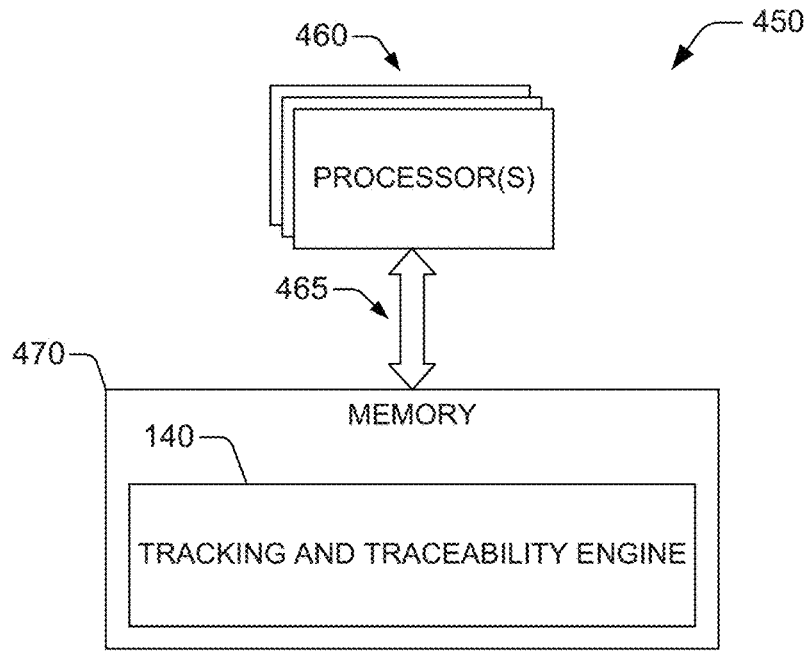
FIG. 4B presents an example of a computing system for tracking and traceability of parts of a product, in accordance with one or more embodiments of the disclosure.

FIG. 4B presents an example of a computing system 450 for tracking and traceability of parts of a product, in accordance with one or more embodiments of the disclosure. The illustrated computing system 450 includes one or more processor(s) 460 and one or more memory devices 470 (generically referred to as memory 470) that include machine-accessible instructions (e.g., computer-readable and/or computer-executable instructions) that can be accessed and executed by at least one of the processor(s) 460. In one example, the processor(s) 460 can be embodied in or can constitute a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), a combination thereof, or the like. In some embodiments, the processor(s) 460 can be arranged in a single computing apparatus (e.g., a blade server). In other embodiments, the processor(s) 460 can be distributed across two or more computing apparatuses.

The processor(s) 460 can be functionally coupled to the memory 470 by means of a communication architecture 465. The communication architecture 465 is suitable for the particular arrangement (localized or distributed) of the processor(s) 460. As such, the communication architecture 465 can include one or more of access point devices; router devices; switch devices; server devices; aggregator devices; bus architectures; a combination of the foregoing; or the like.

In the computing system 450, the memory 470 includes the tracking and traceability engine 140. In such an embodiment, the tracking and traceability engine includes machine-accessible instructions (e.g., computer-readable and/or computer-executable instructions) that embody or constitute the tracking and traceability engine 140. The instructions are encoded in the memory 470 and can be arranged in components that can be built (e.g., linked and compiled) and retained in computer-executable form in the memory 470 (as is shown) or in one or more other machine-accessible non-transitory storage media. As such, in some embodiments, the instructions can be arranged in modules (not depicted in FIG. 4B) such as those modules shown in FIG. 4A.

In the computing system 450, the machine-accessible instructions that form the track and traceability engine 140 can be executed by at least one processor of the processor(s) 460. It is noted that while not illustrated, the computing system 450 also can include other types of computing resources (e.g., interface(s) (such as I/O interfaces; controller devices(s); power supplies; and the like) that can permit or otherwise facilitate the execution of the software components (e.g., engines and modules). To that point, for instance, the memory 470 also can include programming interface(s) (such as application programming interfaces (APIs)), an operating system, firmware, and the like. Execution of the instructions can cause the at least one processor—and, thus, the computing system 450—to provide tracking and traceability of parts of product, in accordance with aspects of this disclosure.

Figure 5:
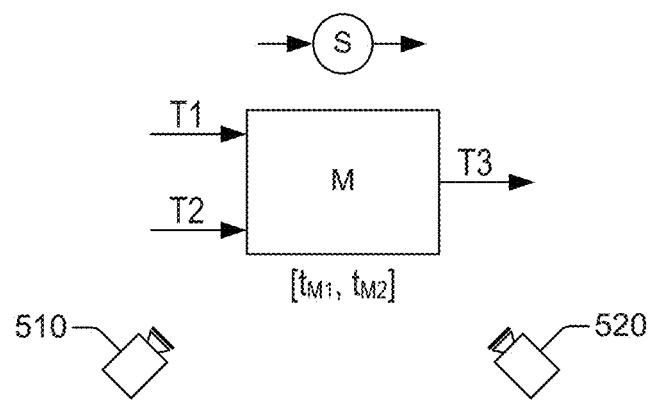
FIG. 5 illustrates a schematic diagram of a job of a manufacturing process, in accordance with one or more embodiments of the disclosure.

As an illustration of tracking aspects of this disclosure, FIG. 5 illustrates an example job S of a manufacturing process that can be implemented by the industrial equipment 110, in accordance with one or more embodiments of the disclosure. The job S includes combining a parts of type T1 and a part of type T2 into one part of type T3. The part of type T3 can be a constituent part of a planned finished object (e.g., object 116). As is disclosed herein (see FIG. 2, for example), interconnecting several of this type of job, a wide variety of manufacturing process can be arranged.

In the example job S, manufacture rules of the manufacturing process embody or constitute prior knowledge. For example, a first manufacture rule corresponding to the job S can state that part of type T1 and part of type T2 are supplied to a machine M, after a defined time t (a real number in units of time) in the range $[t_{M,1}, t_{M,2}]$, an output part of type T3 result from the job S.

The analysis module 430 can generate a conclusion using logic statements (from a semantic perception analysis) and defined time constraints. The analysis module 430 can generate the logic statements from video segments generated by a first camera 510 (or another type of imaging sensor device) and a second camera 520 (or another type of imaging sensor device). Specifically, the perception module 432, which can be embodied in or can include a machine-vision module (not depicted) can generate a first observation indicative of a product P1 of type T1, at time $t_{12}$ at a location L1, with a probability $p_1$ (0.9, for example); a second observation indicative of a product P2 of type T2, at time $t_{12}$ at a location L2, with a probability $p_2$ (1, for example); and a third observation indicative of a product P3 of type T3, at time $t_3$ at location L3, with probability $p_3$ (0.9, for example). Time $t_3$ can satisfy the following constraint: $t_{M,1} < |t_3 - t_{12}| < t_{M,2}$. It is noted that the first manufacture rule defines the types, while the inference and reasoning engine make statement on the actual parts.

The analysis module 430 can include an artificial reasoning module 436 (see FIG. 4) that can apply the foregoing first manufacture rule to generate the conclusion. While the first manufacture rule defines types of parts, the artificial reasoning engine generates a conclusion (or a logical statement) on the actual parts. Specifically, the artificial reasoning module can implement the following logic: At the time 0, if P1 of type T1 and P2 of T2 observed entering machine M, at time t (t is within range $[t_{M11}, t_{M12}]$), if P3 of type T3 observed as output of M, then, the artificial reasoning module can determine, with 100% certainty, that P3 is made of P1 and P2.

The artificial reasoning module also can implement logic in instances in which an anomaly is present. For example, if P3 is not observed as output of machine M within a time in the range $[t_{M,1}, t_{M,2}]$, then generate an inference to assign a probability $p_3$ to part P3 of type T3. In some embodiments, $p_3$ is determined using probabilistic STL. In other embodiments, the probability $p_3$ can be learned from historical manufacturing data. In another example, if P1 is not observed as input of machine M and instead a probability $p_1$ is ascribed to the occurrence of P1, then propagate probability $p_1$ to probability $p_3$ through inference. For example, an STL formula can incorporate the probability of the assembly machine being healthy in order to affect probability $p_3$ The certainty about $P_1$ and $P_2$ being made available by the limit time when the assembly machine starts its operation also affects probability $p_3$. The combinations of probabilities can used minimum values of the arguments for conjunctions and maximum for disjunctions.

In some embodiments, $p_1$ is determined using probabilistic STL. In other embodiments, the probability $p_1$ can be learned from historical manufacturing data. Therefore, whether an anomaly is present or not, the analysis component 140, via the artificial reasoning module 436, can assert that part P3 resulting from job S is made of part P1 and part P2 with a probability $p_3$.

The artificial reasoning module can operate in numerous ways. For example, in one embodiment, the reasoning engine can be active essentially constantly over time, e.g. to demonstrate satisfaction of high level production goals (e.g. car is assembled at the exit of the assembly floor at times 10, 20, 30 etc.). For each of this the artificial reasoning engine can accomplish proof of the formula "car is assembled successfully at t=10)", etc. (t=20 . . . ). In instances in which a goal cannot be demonstrated an alarm can be triggered over the respective time interval, and a digital trace record (e.g., the digital trace record 150) can be supplied (e.g., sent or made available) to perform a root cause analysis in order to identify problems, locations, etc.

As another example, in another embodiment, the artificial reasoning module can be activated in response to presence of an anomaly in the regular overall tracking and tracing process. For example, the artificial reasoning module 436 can be activated in response (e.g., upon or after) imprecision in semantic perception; or when information for regular labeling of the track and trace process is missing because it was not generated due to occlusions etc., and so on.

As other jobs in the manufacture process plan to form the finished product 116, the artificial reasoning module can generate other assertions based on rules within such a plan, in a manner similar to that disclosed hereinbefore. As is disclosed herein, the assertions (or reasoning) in conjunction with a collection of observations (or a series of semantic data) during the execution of the manufacture process plan form a digital trace record.

Figure 6:
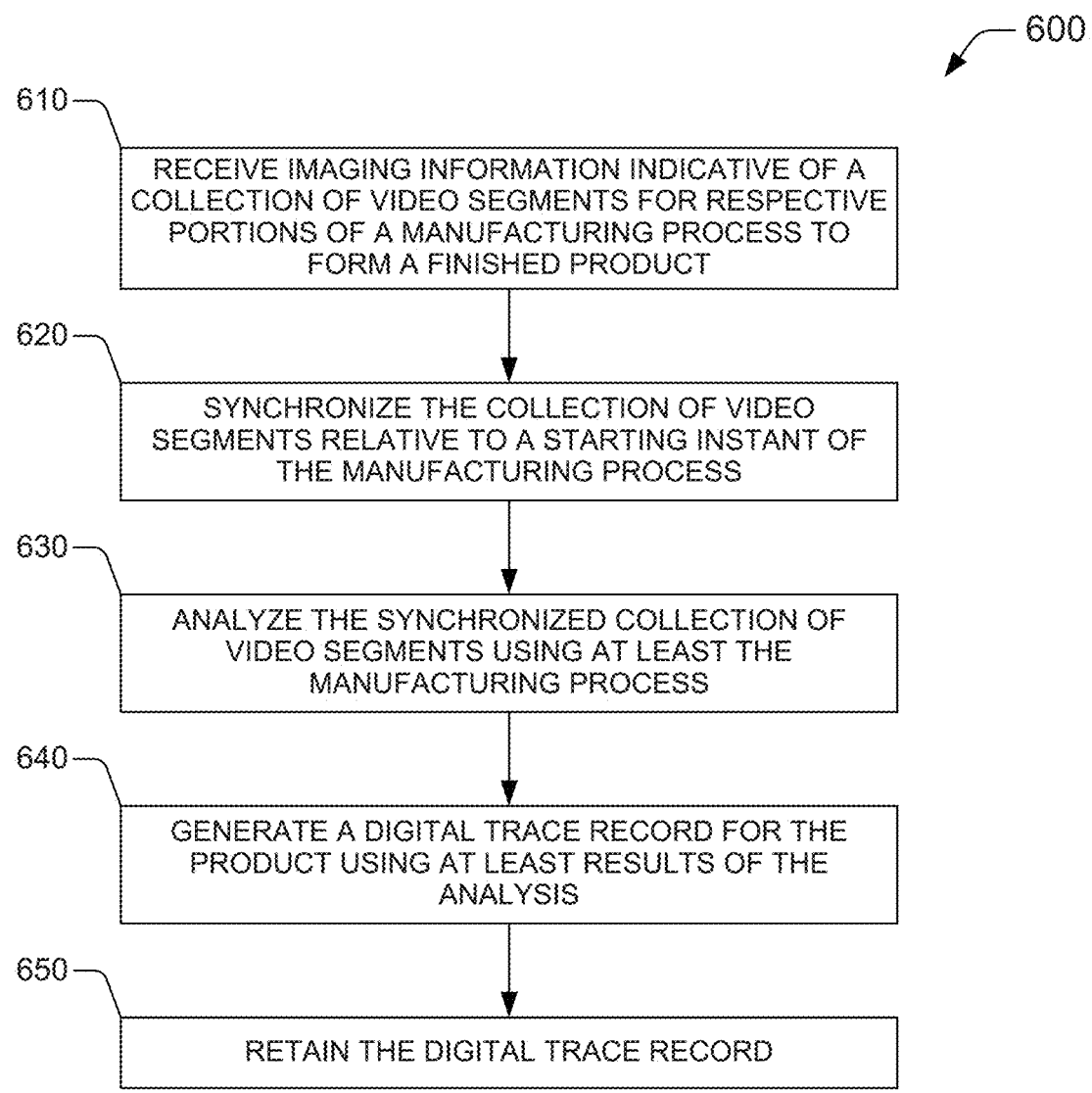
FIGS. 6-7 present respective examples of a method for tracking and traceability of components of a product, in accordance with one or more embodiments of the disclosure.
Figure 7:
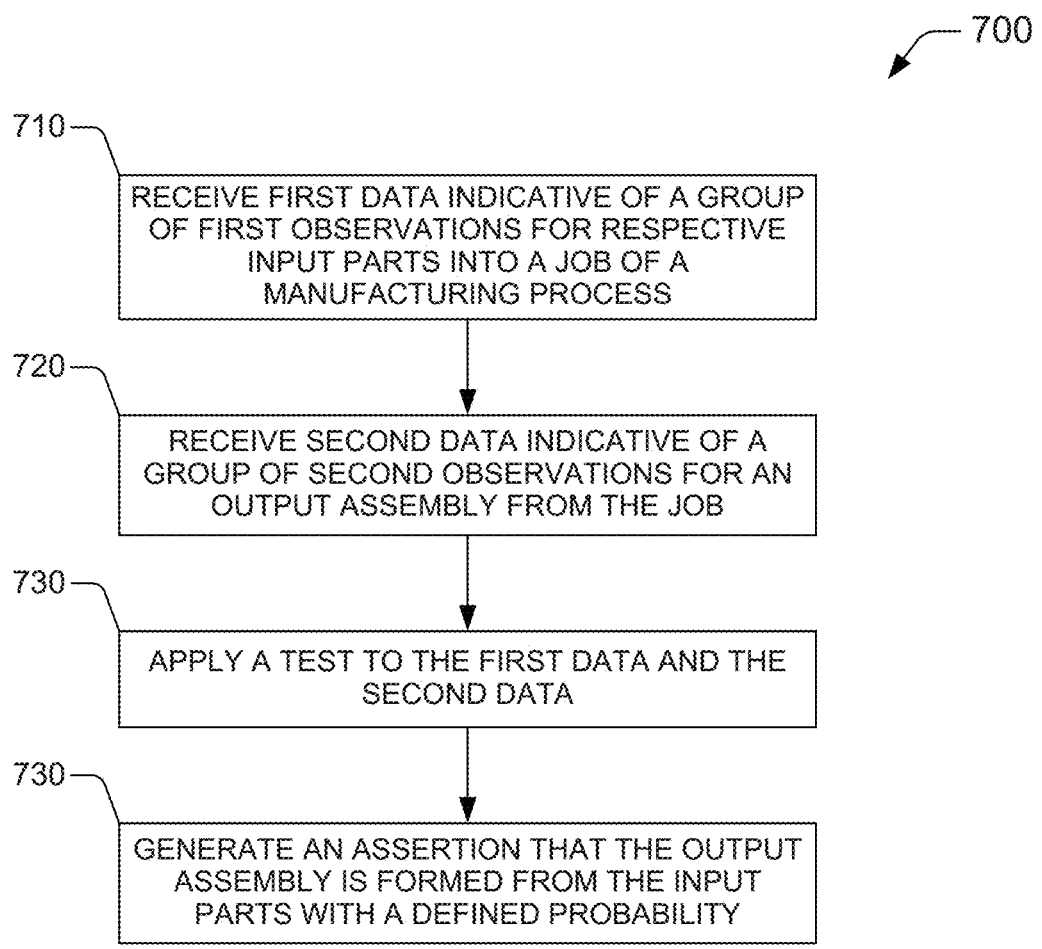

In view of various aspects described herein, examples of methods that can be implemented in accordance with this disclosure can be better appreciated with reference to FIGS. 6-7. For purposes of simplicity of explanation, the exemplified methods (and other techniques disclosed herein) are presented and described as a series of operations. It is noted, however, that the exemplified methods and any other techniques of this disclosure are not limited by the order of operations. Some operations may occur in different order than that which is illustrated and described herein. In addition, or in the alternative, some operations can be performed essentially concurrently with other operations (illustrated or otherwise). Further, not all illustrated operations may be required to implement an exemplified method or technique in accordance with this disclosure. Furthermore, in some embodiments, two or more of the exemplified methods and/or other techniques disclosed herein can be implemented in combination with one another to accomplish one or more elements and/or technical improvements disclosed herein.

In some embodiments, one or several of the exemplified methods and/or other techniques disclosed herein can be represented as a series of interrelated states or events, such as in a state-machine diagram. Other representations also are possible. For example, interaction diagram(s) can represent an exemplified method and/or a technique in accordance with this disclosure in scenarios in which different entities perform different portions of the disclosed methodologies.

It should be further appreciated that the example methods disclosed in this specification can be retained or otherwise stored on an article of manufacture (such as a computer-program product) in order to permit or otherwise facilitate transporting and transferring such example methods to computers for execution, and thus implementation, by processor(s) or for storage in a memory.

Methods disclosed throughout the subject specification and annexed drawings are capable of being stored on an article of manufacture to facilitate transporting and transferring such methodologies to computers or other types of information processing machines or processing circuitry for execution, and thus implementation by a processor or for storage in a memory device or another type of computer-readable storage device. In one example, one or more processors that perform a method or combination of methods disclosed herein can be utilized to execute programming code instructions retained in a memory device or any computer-readable or machine-readable storage device or non-transitory storage media, to implement one or several of the exemplified methods and/or other techniques disclosed herein. The programming code instructions, when executed by the one or more processors can implement or carry out the various operations in the exemplified methods and/or other technique disclosed herein.

The programming code instructions, therefore, provide a computer-executable or machine-executable framework to implement the exemplified methods and/or other techniques disclosed herein. More specifically, yet not exclusively, each block of the flowchart illustrations and/or combinations of blocks in the flowchart illustrations can be implemented by the programming code instructions.

FIG. 6 presents an example of a flowchart of an example method 600 for tracking and tracing parts of a finished product, in accordance with one or more embodiments of the disclosure. The example method 600 can be implemented, entirely or in part, by a computing system having one or more processors, one or more memory devices, and/or other types of computing resources. In some embodiments, the computing system can embody or can include at least the ingestion module 410, the synchronization module 420, and the analysis module 430.

At block 610, the computing system can receive information (e.g., data, metadata, and/or signaling) indicative of a collection of video segments for respective portions of execution of the manufacturing process to form a complete product. As is disclosed herein, in some embodiments, each one of the video segments can be generated by a camera positioned at a defined location within a plant or factory in which the complete product is manufactured. In other embodiments, at least one of the video segments can be generated by a mobile unmanned robot fitted with an imaging sensor device. The example method 600 can include, in some embodiments, one or more streams of other types of data (imaging data, audio data, and/or haptic data) representative of portions of the execution of the manufacturing process. Information indicative of the collection of video segments and one or more of the other types of data can be collectively referred to as monitoring information.

At block 620, the computing system can synchronize the collection of video segments relative to a starting instant of the manufacturing process. As is disclosed herein, synchronizing the collection of video segments also can include aggregating the segments into a single video record of the execution of the manufacturing process. In embodiments in which other streams of data are available, the computing system also can synchronize at least a portion of such streams of data. The streams of data can be synchronized independently or in combination with the collection of video segments, to produce another single data record of the execution of the manufacturing process.

At block 630, the computing system can analyze the synchronized collection of video segments (or, in some instances, the single video record) using at least the manufacturing process. In some embodiments, the computing system also can analyze the synchronized streams of data (e.g., imaging data, audio data, and/or haptic data). At block 640, the computing system can generate a digital trace record of the complete product using at least the single video record and/or results from the analysis. The computing system also can generate a second digital trace record of the complete product using the single data record. In some embodiments, computing system can refine the digital trace record by aggregating the single data record to the single video record and/or the results of the analysis. At block 650, the computing can retain the digital trace record.

FIG. 7 presents a flowchart of an example method 700 for tracking and tracing parts of a finished product, in accordance with one or more embodiments of the disclosure. The example method 700 can be implemented, entirely or in part, by a computing system having one or more processors, one or more memory devices, and/or other types of computing resources. In some embodiments, the computing system can embody or can include at least the ingestion module 410, the synchronization module 420, and the analysis module 430.

At block 710, the computing system can receive first data indicative of a group of first observations for respective input parts into a job of a manufacturing process. At block 720, the computing system can receive second data indicative of a group of second observations for an output assembly from the job. Each one (or, in some embodiments, at least one) of the observations in the first group and the second group is probabilistic and can be generated based on imaging sensor devices (e.g., a camera, an infrared photodetector device, a LIDAR sensor device, or the like) and/or other types of sensor devices.

At block 730, the computing system can apply a test to the first data and the second data. The test can be embodied in a rule of the manufacturing process or in another type of prior knowledge related to the manufacturing process. At block 740, the computing system can generate an assertion that the output assembly is formed from the input parts with a defined probability. As mentioned, in some embodiments, the defined probability can be determined based at least on probabilistic STL.

Figure 8:
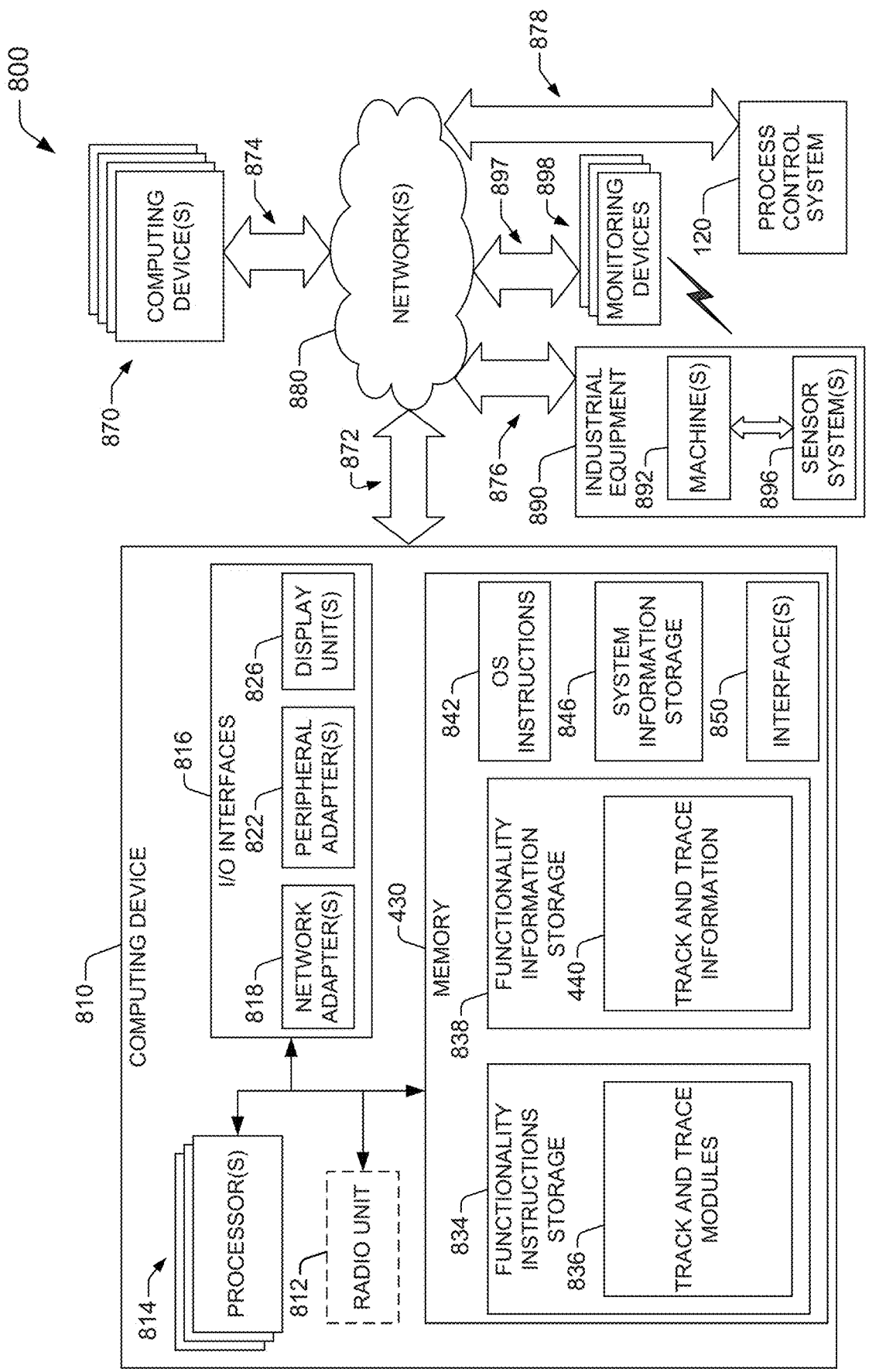
FIG. 8 presents an example of an operational environment in which tracking and traceability of components of a product can be implemented in accordance with one or more embodiments of the disclosure.

FIG. 8 presents an example of an operational environment in which functionality associated with tracking and traceability can be implemented in accordance with one or more embodiments of the disclosure. The exemplified operational environment 800 is merely illustrative and is not intended to suggest or otherwise convey any limitation as to the scope of use or functionality of the operational environment's architecture. In addition, the exemplified operational environment 800 depicted in FIG. 8 should not be interpreted as having any dependency or requirement relating to any one or combination of modules or other types of components illustrated in other example operational environments of this disclosure.

The example operational environment 800 or portions thereof can embody or can constitute other ones of the various operational environments and systems described hereinbefore. As such, the computing device 810, individually or combination with at least one of the computing device(s) 870), can embody or can constitute the ingestion module 410, the synchronization module 420, and the analysis module 430.

In one example, the computing device 810 can be embodied in a portable personal computer or a handheld computing device, such as a mobile tablet computer or the like. In another example, the computing device 810 can be embodied in a wearable computing device. The computing device 810 also can embody or can constitute other types of mobile computing devices.

The computational environment 800 represents an example implementation of the various aspects or elements of the disclosure in which the processing or execution of operations described in connection with tracking and traceability in accordance with aspects disclosed herein can be performed in response to execution of one or more software components at the computing device 810. Such one or more software components render the computing device 810 (or any other computing device that contains the software component(s) a particular machine for tracking and traceability in accordance with aspects described herein, among other functional purposes.

A software component can be embodied in or can include one or more computer-accessible instructions (e.g., computer-readable and/or computer-executable instructions). In some embodiments, as mentioned, at least a portion of the computer-accessible instructions can be executed to perform at least a part of one or more of the example methods (e.g., method 600 and method 700) and/or other techniques described herein.

For instance, to embody one such method, at least the portion of the computer-accessible instructions can be retained in a computer-readable storage non-transitory medium and executed by one or more processors (e.g., at least one of processor(s) 814). The one or more computer-accessible instructions that embody or otherwise constitute a software component can be assembled into one or more program modules, for example. Such program module(s) can be compiled, linked, and/or executed (by one or more of the processor(s) 814) at the computing device 810 or other computing devices.

Further, such program module(s) can include computer code, routines, programs, objects, components, information structures (e.g., data structures and/or metadata structures), etc., that can perform particular tasks (e.g., one or more operations) in response to execution by one or more processors. At least one of such processor(s) can be integrated into the computing device 810. For instance, the one or more processor that can execute the program module(s) can be embodied in or can include a non-empty subset the processor(s) 814. In addition, at least another one of the processor(s) can be functionally coupled to the computing device 810.

The various example embodiments of the disclosure can be operational with numerous other general purpose or special purpose computing system environments or configurations. Examples of well-known computing systems, environments, and/or configurations that can be suitable for implementation of various aspects or elements of the disclosure in connection with tracking and traceability in accordance with aspects of this disclosure can include personal computers; server computers; laptop devices; handheld computing devices, such as mobile tablets or e-readers; wearable computing devices; and multiprocessor systems. Additional examples can include, programmable consumer electronics, network personal computers (PCs), minicomputers, mainframe computers, blade computers, programmable logic controllers, distributed computing environments that comprise any of the above systems or devices, and the like.

As is illustrated in FIG. 8, the computing device 810 includes one or more processors 814, one or more input/output (I/O) interfaces 816; one or more memory devices 830 (collectively referred to as memory 830); and a bus architecture 832 (also termed bus 832). The bus architecture 832 functionally couples various functional elements of the computing device 810. The bus 832 can include at least one of a system bus, a memory bus, an address bus, or a message bus, and can permit or otherwise facilitate the exchange of information (data, metadata, and/or signaling) between the processor(s) 814, the I/O interface(s) 816, and/or the memory 830, or respective functional elements therein. In some scenarios, the bus 832 in conjunction with one or more internal programming interfaces 850 (collectively referred to as interface(s) 850) can permit or otherwise facilitate such exchange of information. In scenarios in which the processor(s) 814 include multiple processors, the computing device 810 can utilize parallel computing.

In some embodiments, the computing device 810 can include, optionally, a radio unit 812. The radio unit 812 can include one or more antennas and a communication processing unit that can permit wireless communication between the computing device 810 and another device, such as one of the computing device(s) 870 or a sensor device of the sensor system(s) 896.

The I/O interface(s) 816 can permit or otherwise facilitate communication of information between the computing device 810 and an external device, such as another computing device (e.g., a network element or an end-user device) or a sensor device. Such communication can include direct communication or indirect communication, such as the exchange of information between the computing device 810 and the external device via a network or elements thereof. In some embodiments, as is illustrated in FIG. 8, the I/O interface(s) 816 can include one or more of network adapter(s) 818, peripheral adapter(s) 822, and display unit(s) 826. Such adapter(s) can permit or otherwise facilitate connectivity between the external device and one or more of the processor(s) 814 or the memory 830. For example, the peripheral adapter(s) 822 can include a group of ports, which can include at least one of parallel ports, serial ports, Ethernet ports, V.35 ports, or X.21 ports. In certain embodiments, the parallel ports can comprise General Purpose Interface Bus (GPIB), IEEE-1284, while the serial ports can include Recommended Standard (RS)-232, V.11, Universal Serial Bus (USB), FireWire or IEEE-1394.

At least one of the network adapter(s) 818 can functionally couple the computing device 810 to one or more computing devices 870 via one or more communication links (wireless, wireline, or a combination thereof) and one or more networks 880 that, individually or in combination, can permit or otherwise facilitate the exchange of information (data, metadata, and/or signaling) between the computing device 810 and the one or more computing devices 870. Such network coupling provided at least in part by the at least one of the network adapter(s) 418 can be implemented in a wired environment, a wireless environment, or both. The network(s) 880 can include several types of network elements, including base stations; router devices; switch devices; server devices; aggregator devices; bus architectures; a combination of the foregoing; or the like. The network elements can be assembled to form a local area network (LAN), a metropolitan area network (MAN), a wide area network (WAN), and/or other networks (wireless or wired) having different footprints.

Information that is communicated by at least one of the network adapter(s) 818 can result from the implementation of one or more operations of a method (or technique) in accordance with aspects of this disclosure. Such output can be any form of visual representation, including textual, graphical, animation, audio, haptic, and the like. In some scenarios, each one of the computing device(s) 870 can have substantially the same architecture as the computing device 810. In addition or in the alternative, the display unit(s) 826 can include functional elements (e.g., lights, such as light-emitting diodes; a display, such as a liquid crystal display (LCD), a plasma monitor, a light-emitting diode (LED) monitor, or an electrochromic monitor; combinations thereof; or the like) that can permit or otherwise facilitate control of the operation of the computing device 810, or can permit conveying or revealing the operational conditions of the computing device 810.

In one aspect, the bus architecture 832 represents one or more of several possible types of bus structures, including a memory bus or a memory controller, a peripheral bus, an accelerated graphics port, and a processor or local bus using any of a variety of bus architectures. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and the like.

The bus architecture 832, and all other bus architectures described herein can be implemented over a wired or wireless network connection and each of the subsystems, including the processor(s) 814, the memory 830 and memory elements therein, and the I/O interface(s) 816 can be contained within one or more remote computing devices 870 at physically separate locations, connected through buses of this form, in effect implementing a fully distributed system.

In some embodiments, such a distributed system can implement the functionality described herein in a client-host or client-server configuration in which the tracking and traceability modules 836 or the tracking and traceability information 840, or both, can be distributed between the computing device 810 and at least one of the computing device(s) 870, and the computing device 810 and at least one of the computing device(s) 870 can execute such modules and/or leverage such information.

The computing device 810 can include a variety of computer-readable media. Computer-readable media can be any available media (transitory and non-transitory) that can be accessed by the computing device 810. In one aspect, computer-readable media can include computer non-transitory storage media (or computer-readable non-transitory storage media) and communications media. Example computer-readable non-transitory storage media can include, for example, both volatile media and non-volatile media, and removable and/or non-removable media. In one aspect, the memory 830 can include computer-readable media in the form of volatile memory, such as random access memory (RAM), and/or non-volatile memory, such as read-only memory (ROM).

As is illustrated in FIG. 8, the memory 830 can include functionality instructions storage 834 and functionality information storage 838. The functionality instructions storage 834 can include computer-accessible instructions that, in response to execution (by at least one of the processor(s) 814, for example), can implement one or more of the tracking and traceability functionalities of the disclosure.

The computer-accessible instructions can embody or can comprise one or more software components illustrated as track and trace modules 836.

In one scenario, execution of at least one component of the track and trace modules 836 can implement one or more of the methods disclosed herein, such as the example methods 600 and 700. For instance, such execution can cause a processor (e.g., one of the processor(s) 814) that executes the at least one component to carry out a disclosed example method or another technique of this disclosure.

It is noted that, in one aspect, a processor of the processor(s) 814 that executes at least one of the track and trace modules 836 can retrieve information from or retain information in one or more memory elements 840 in the functionality information storage 838 in order to operate in accordance with the functionality programmed or otherwise configured by the track and trace modules 836. The one or more memory elements 840 can be generically referred to as track and trace information 840. Such information can include at least one of code instructions, information structures, or the like. For instance, at least a portion of such information structures can be indicative or otherwise representative of a defined contingency plan, historical operation data of the industrial equipment 110, and the like.

In some embodiments, one or more of the track and trace modules 836 can embody or can constitute, for example, the analytic engine 130, the anomaly detector module 150, the contingency generator module 160, or a combination thereof, in accordance with aspects of this disclosure.

At least one of the one or more interfaces 850 (e.g., application programming interface(s)) can permit or otherwise facilitate communication of information between two or more modules within the functionality instructions storage 834. The information that is communicated by the at least one interface can result from implementation of one or more operations in a method of the disclosure. In some embodiments, one or more of the functionality instructions storage 834 and the functionality information storage 838 can be embodied in or can comprise removable/non-removable, and/or volatile/non-volatile computer storage media.

At least a portion of at least one of the track and trace modules 736 or the track and trace information 840 can program or otherwise configure one or more of the processors 814 to operate at least in accordance with the track and trace functionality disclosed herein. One or more of the processor(s) 814 can execute at least one of the track and trace modules 836 and leverage at least a portion of the information in the functionality information storage 838 in order to provide management of calls from unknown callers in accordance with one or more aspects described herein.

It is noted that, in some embodiments, the functionality instructions storage 834 can embody or can comprise a computer-readable non-transitory storage medium having computer-accessible instructions that, in response to execution, cause at least one processor (e.g., one or more of the processor(s) 814) to perform a group of operations comprising the operations or blocks described in connection with the example methods 600 and 700 and other techniques disclosed herein.

The memory 830 also can include computer-accessible instructions and information (e.g., data, metadata, and/or programming code instructions) that permit or otherwise facilitate the operation and/or administration (e.g., upgrades, software installation, any other configuration, or the like) of the computing device 810. Accordingly, as is illustrated, the memory 830 includes a memory element 842 (labeled operating system (OS) instructions 842) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 810 can dictate a suitable OS.

The memory 830 further includes a system information storage 846 having data, metadata, and/or programming code (e.g., firmware) that can permit or otherwise can facilitate the operation and/or administration of the computing device 810. Elements of the OS instructions 842 and the system information storage 846 can be accessible or can be operated on by at least one of the processor(s) 814.

While the functionality instructions storage 834 and other executable program components (such as the OS instructions 842) are illustrated herein as discrete blocks, such software components can reside at various times in different memory components of the computing device 810 and can be executed by at least one of the processor(s) 814. In certain scenarios, an implementation of the track and trace modules 836 can be retained on or transmitted across some form of computer-readable media.

The computing device 810 and/or one of the computing device(s) 870 can include a power supply (not shown in FIG. 8), which can power up components or functional elements within such devices. The power supply can be a rechargeable power supply, e.g., a rechargeable battery, and it can include one or more transformers to achieve a power level suitable for the operation of the computing device 810 and/or one of the computing device(s) 870, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 818) to connect operationally to the conventional power grid. In another aspect, the power supply can include an energy conversion component, such as a solar panel, to provide additional or alternative power resources or autonomy for the computing device 810 and/or one of the computing device(s) 870.

As is illustrated in FIG. 8, in some instances, the computing device 810 can operate in a networked environment by utilizing connections to one or more remote computing devices 870. As an illustration, a remote computing device can be a personal computer, a portable computer, a server, a router, a network computer, a peer device or other common network node, and so on. As described herein, connections (physical and/or logical) between the computing device 810 and a computing device of the one or more remote computing devices 870 can be made via one or more networks 880, and various communication links (wireless or wireline). The network(s) 880 can include several types of network elements, including base stations; router devices; switch devices; server devices; aggregator devices; bus architectures; a combination of the foregoing; or the like. The network elements can be assembled to form a local area network (LAN), a metropolitan area network (MAN), a wide area network (WAN), and/or other networks (wireless or wired) having different footprints.

In addition, as is illustrated the communication links can be assembled in a first group of communication links 874 and a second group of communication links 872. Each one of the communication links in both groups can include one of an upstream link (or uplink (UL)) or a downstream link (or downlink (DL)). Each one of the UL and the DL can be embodied in or can include wireless links (e.g., deep-space wireless links and/or terrestrial wireless links), wireline links (e.g., optic-fiber lines, coaxial cables, and/or twisted-pair lines), or a combination thereof.

The first group of communication links 874 and the second group of communication links 872 can permit or otherwise facilitate the exchange of information (e.g., data, metadata, and/or signaling) between at least one of the computing device(s) 870 and the computing device 810. To that end, one or more links of the first group of communication links 874, one or more links of the second group of communication links 874, and at least one of the network(s) 880 can form a communication pathway between the communication device 810 and at least one of the computing device(s) 870.

In one or more embodiments, one or more of the disclosed methods can be practiced in distributed computing environments, such as grid-based environments, where tasks can be performed by remote processing devices (computing device(s) 870) that are functionally coupled (e.g., communicatively linked or otherwise coupled) through at least one of network(s) 810. In a distributed computing environment, in one aspect, one or more software components (such as program modules) can be located within both a local computing device (e.g., computing device 810) and at least one remote computing device.

In some embodiments, as is illustrated in FIG. 8, the operational environment 800 can include industrial equipment 890. The industrial equipment 890 can embody or can include the industrial equipment 110. Thus, the industrial equipment 890 can include one or more machines 892 and one or more sensor systems 896 that can probe at least one of the machine(s) 892. In one aspect, the machine(s) 892 can embody or can constitute the hardware 114. In addition, at least one of the sensor system(s) 896 can be embodied in or can include sensor devices $118_1$-$118_D$. The computing device 810 and at least one of the computing device(s) 870, individually or in combination, can monitor a condition of the industrial equipment 890 in accordance with aspects of this disclosure. To that end, in some aspects, multiple sensor devices of the sensor system(s) 896 can be functionally coupled (e.g., communicatively coupled, electrically coupled, and/or electromechanically coupled) to the computing device 810 and/or at least one of the computing device(s) 870. Specifically, one or more of the sensor devices can communicate with the computing device 810 via a communication pathway formed by communication links 876, at least one of network(s) 880, and communication links 872. Similarly, the sensor device(s) can communicate with at least one of the computing devices 870 via another communication pathway formed by the communication links 876, at least one of the network(s) 880, and the communication links 874.

Communication links 876 and communication links 872 can permit or otherwise facilitate the exchange of information (e.g., data, metadata, and/or signaling) between the sensor devices of the sensor system(s) 896 and the computing device. Similarly, communication links 876 and communication links 874 can permit or otherwise facilitate the exchange of information (e.g., data, metadata, and/or signaling) between the sensor devices of the sensor system(s) 896 and one or more of the computing device(s) 870. Communication links 876 includes, for example, an upstream link (or uplink (UL)) and a downstream link (or downlink (DL)). Each one of the UL and the DL can be embodied in or can include wireless links (e.g., deep-space wireless links and/or terrestrial wireless links), wireline links (e.g., optic-fiber lines, coaxial cables, and/or twisted-pair lines), or a combination thereof.

In accordance with aspects of this disclosure, the process control system 120 can automate the execution of a manufacturing process that can be implemented by the industrial equipment 890. To that end, the control system 120 can exchange information with at least one of the sensor system(s) 896 and/or other control devices (such as actuator devices, switch devices, and the like; not depicted in FIG. 8). In some embodiments, a communication pathway formed by communication links 878, at least one of network(s) 880, and communication links 876 can permit the exchange of information (e.g., data, metadata, and/or signaling) between the process control system 120 and at least one of the sensor system(s) 896 or other components of the industrial equipment 890.

The operational environment 800 also includes monitoring devices 898 can generate imaging data, audio data, and/or other types of ambient data. Regardless of type, such data can be supplied (e.g., sent of made available) to the computing devices 810 and/or at least one of the computing device(s) 870 to generate streams of video segments, audio segments, and/or other data structures, in accordance with aspects of this disclosure. The monitoring devices can be positioned at specific locations within a region that houses the industrial equipment 890. The monitoring devices 898 can be embodied in or can include a combination of imaging devices (e.g., visible-light cameras, infrared sensor devices, LIDAR devices, or the like), microphones, mobile unmanned vehicles (e.g., drones) fitted with sensory devices, mobile robots fitted with sensory devices, and/or other types of devices that can collect ambient information (e.g., ambient light intensity) within such a region. In one embodiment, the monitoring devices 898 can include cameras $130_1$-$130_N$.

In some embodiments, a communication pathway formed by communication links 897, at least one of network(s) 880, and communication links 872 can permit the exchange of information (e.g., data, metadata, and/or signaling) between at least one of the monitoring devices 898 and the computing device 810. In addition, or in other embodiments, a second communication pathway formed by communication links 897, at least one of network(s) 880, and communication links 874 can permit the exchange of information (e.g., data, metadata, and/or signaling) between at least one of the monitoring devices 898 and at least one of the computing device(s) 870.

Similar to other communication links disclosed herein, the communication links 897 can include, for example, an UL and a DL. Each one of the UL and the DL can be embodied in or can include wireless links (e.g., deep-space wireless links and/or terrestrial wireless links), wireline links (e.g., optic-fiber lines, coaxial cables, and/or twisted-pair lines), or a combination thereof.

Various embodiments of the disclosure may take the form of an entirely or partially hardware embodiment, an entirely or partially software embodiment, or a combination of software and hardware (e.g., a firmware embodiment). Further, as described herein, various embodiments of the disclosure (e.g., systems and methods) may take the form of a computer program product including a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit the performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can be embodied in or can include ROM; RAM; magnetic disk storage media; optical storage media; flash memory, etc.

At least some of the embodiments of the operational environments and techniques are described herein with reference to block diagrams and flowchart illustrations of methods, systems, apparatuses, and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or technique put forth herein be construed as requiring that its acts or steps be performed in a specific order. Accordingly, where a process or a method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to the arrangement of steps or operational flow; plain meaning derived from grammatical organization or punctuation; the number or type of embodiments described in the specification or annexed drawings, or the like.

As used in this application, the terms "environment," "system," "engine," "module," "component," "architecture," "interface," "unit," and the like refer to a computer-related entity or an entity related to an operational apparatus with one or more defined functionalities. The terms "environment," "system," "engine," "module," "component," "architecture," "interface," and "unit" can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

As is utilized in this disclosure, the term "processor" can refer to any type of processing circuitry or device. A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory.

Additionally, or as another example, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed or otherwise configured (e.g., manufactured) to perform the functions described herein.

In some embodiments, processors can utilize nanoscale architectures. in order to optimize space usage or enhance the performance of systems, devices, or other electronic equipment in accordance with this disclosure. For instance, a processor can include molecular transistors and/or quantum-dot based transistors, switches, and gates, Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The flowchart and block diagrams in the Figures illustrate the architecture, functionality, and operation of possible implementations of examples of systems, methods, and computer program products according to various embodiments of the present disclosure. In this regard, each block in the flowchart or block diagrams may represent a module, segment, or portion of instructions, which includes one or more machine- or computer-executable instructions for implementing the specified operations. It is noted that each block of the block diagrams and/or flowchart illustration, and combinations of blocks in the block diagrams and/or flowchart illustration, can be implemented by special purpose hardware-based systems that perform the specified functions or operations or carry out combinations of special purpose hardware and computer instructions.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable non-transitory storage medium within the respective computing/processing device.

What has been described herein in the present specification and annexed drawings includes examples of systems, devices, techniques, and computer program products that, individually and in combination, permit the tracking and traceability of parts of a product manufactured in industrial equipment. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A computer-implemented method, comprising:
    receiving, by a computing system including at least one processor, imaging information indicative of a collection of video segments for respective portions of a manufacturing process to form a product;
    synchronizing, by the computing system, the collection of video segments relative to a starting instant of the manufacturing process;
    generating, by the computing system, a group of observations by analyzing the synchronized collection of video segments using at least the manufacturing process;
    generating, by the computing system, a group of assertions using probabilistic signal temporal logic based on at least the group of observations and assembly rules corresponding to the manufacturing process; and
    generating, by the computing system, a digital trace record for the product using at least the group of observations and the group of assertions.

2. The computer-implemented method of claim 1, further comprising supplying the digital trace record to a second computing system comprising at least one second processor, the second computing system included in one of a manufacturing execution system (MES) or a production lifecycle management (PLM) system.

3. The computer-implemented method of claim 1, wherein the receiving comprises receiving a first portion of the imaging information from an imaging sensor device positioned at a defined location near a machine that performs a job of the manufacturing process, the imaging sensor device includes one a camera, an infrared electromagnetic radiation photodetector device, or a light detection and ranging (LIDAR) sensor device.

4. The computer-implemented method of claim 1, wherein the generating the group of observations comprises identifying a defined feature in an image frame of a first video segment of the collection of video segments.

5. The computer-implemented method of claim 4, wherein the defined feature corresponds to one of a defined part that constitutes an assembly or the assembly, and wherein the identifying comprises performing a machine-vision technique that identifies one of the defined part or the assembly.

6. The computer-implemented method of claim 1, wherein the generating the group of assertions comprises:
receiving, by the computing system, first data indicative of a group of first observations for respective input parts into a job of the manufacturing process;
receiving, by the computing system, second data indicative of a group of second observations for an output assembly from the job; and
applying a first assembly rule of the assembly rules to the first data and the second data.

7. The computer-implemented method of claim 6, further comprising generating a first assertion of the group of assertions using signal temporal logic, the first assertion comprises a statement that the output assembly is formed from the input parts with a defined probability.

8. A computer program product comprising at least one non-transitory storage medium readable by at least one processing circuit, the non-transitory storage medium having encoded thereon instructions executable by the at least one processing circuit to perform or facilitate operations comprising:
receiving imaging information indicative of a collection of video segments for respective portions of a manufacturing process to form a product;
synchronizing the collection of video segments relative to a starting instant of the manufacturing process;
generating a group of observations by analyzing the synchronized collection of video segments using at least the manufacturing process;
generating a group of assertions using probabilistic signal temporal logic based on at least the group of observations and assembly rules corresponding to the manufacturing process; and
generating a digital trace record for the product using at least the group of observations and the group of assertions.

9. The computer program product of claim 8, the operations further comprising supplying the digital trace record to a second computing system comprising at least one second processor, the second computing system included in one of a manufacturing execution system (MES) or a production lifecycle management (PLM) system.

10. The computer program product of claim 8, wherein the receiving comprises receiving a first portion of the imaging information from an imaging sensor device positioned at a defined location near a machine that performs a job of the manufacturing process, the imaging sensor device includes one a camera, an infrared electromagnetic radiation photodetector device, or a light detection and ranging (LIDAR) sensor device.

11. The computer program product of claim 8, wherein the generating the group of observations comprises identifying a defined feature in an image frame of a first video segment of the collection of video segments.

12. The computer program product of claim 11, wherein the defined feature corresponds to one of a defined part that constitutes an assembly or the assembly, and wherein the identifying comprises performing a machine-vision technique that identifies one of the defined part or the assembly.

13. The computer program product of claim 8, wherein the generating the group of assertions comprises:
receiving first data indicative of a group of first observations for respective input parts into a job of the manufacturing process;
receiving second data indicative of a group of second observations for an output assembly from the job; and
applying a first assembly rule of the assembly rules to the first data and the second data.

14. The computer program product of claim 13, the operations further comprising generating a first assertion of the group of assertions using signal temporal logic, the first assertion comprises a statement that the output assembly is formed from the input parts with a defined probability.

15. A system, comprising:
at least one memory device having stored therein computer-executable instructions; and
at least one processor configured to access the at least one memory device and further configured to execute the computer-executable instructions to:
receive monitoring information including imaging information indicative of a collection of video segments for respective portions of a manufacturing process to form a product;
synchronize at least the collection of video segments relative to a starting instant of the manufacturing process;
generate a group of observations by analyzing at least the synchronized collection of video segments using at least the manufacturing process;
generate a group of assertions using probabilistic signal temporal logic based on at least the group of observations and assembly rules corresponding to the manufacturing process; and
generate a digital trace record for the product using at least the group of observations and the group of assertions.

16. The system of claim 15, wherein the at least one processor is further configured to execute the computer-executable instructions to supply the digital trace record to a second computing system comprising at least one second processor, the second computing system included in one of a manufacturing execution system (MES) or a production lifecycle management (PLM) system.

17. The system of claim 15, wherein to receive the monitoring information, the at least one processor is further configured to execute the computer-executable instructions to receive a first portion of the imaging information from at least one of a first imaging sensor device positioned at a defined location near a machine that performs a job of the manufacturing process or a second imaging sensor device fitted to a mobile unmanned robot, the imaging sensor device includes one a camera, an infrared electromagnetic radiation photodetector device, or a light detection and ranging (LIDAR) sensor device.

18. The system of claim 15, wherein to generate the group of observations, the at least one processor is further configured to execute the computer-executable instructions to identify a defined feature in an image frame of a first video segment of the collection of video segments.

19. The system of claim 15, wherein to generate the group of assertions, the at least one processor is further configured to execute the computer-executable instructions to:
- receive first data indicative of a group of first observations for respective input parts into a job of the manufacturing process;
- receive second data indicative of a group of second observations for an output assembly from the job; and
- apply a first assembly rule of the assembly rules to the first data and the second data.

20. The system of claim 19, the at least one processor further configured to execute the computer-executable instructions to generate a first assertion of the group of assertions using signal temporal logic, the first assertion comprises a statement that the output assembly is formed from the input parts with a defined probability.

* * * * *